(12) United States Patent
Genova et al.

(10) Patent No.: US 6,216,727 B1
(45) Date of Patent: Apr. 17, 2001

(54) WATER FLOW SENSING DEVICE

(75) Inventors: Perry A. Genova, Chapel Hill; Joseph Giallo, Raleigh; Keith Wakefield, Clayton, all of NC (US)

(73) Assignee: FloLogic, Inc., Raleigh, NC (US)

( * ) Notice: Subject to any disclaimer, the term of this patent is extended or adjusted under 35 U.S.C. 154(b) by 0 days.

(21) Appl. No.: 09/416,132

(22) Filed: Oct. 12, 1999

Related U.S. Application Data

(63) Continuation-in-part of application No. 09/262,881, filed on Mar. 8, 1999, now abandoned.

(51) Int. Cl.[7] ................................................. F16K 31/02
(52) U.S. Cl. ...................... 137/487.5; 137/460; 137/486; 73/861.58
(58) Field of Search ..................... 137/459, 460, 137/486, 487.5; 73/199, 861.71, 861.74, 861.58

(56) References Cited

U.S. PATENT DOCUMENTS

| | | | |
|---|---|---|---|
| 3,805,611 | * 4/1974 | Hedland | 73/209 |
| 3,847,020 | * 11/1974 | Jurschak | 73/228 |
| 4,705,060 | * 11/1987 | Gouldbourne | 137/460 |
| 5,004,014 | * 4/1991 | Bender | 137/486 |
| 5,038,820 | * 8/1991 | Ames et al. | 137/460 |
| 5,568,825 | * 10/1996 | Faulk | 137/486 |

* cited by examiner

Primary Examiner—Michael Buiz
Assistant Examiner—Ramesh Krishnamurthy
(74) Attorney, Agent, or Firm—Coats & Bennett, PLLC

(57) ABSTRACT

A water flow-sensing device includes an assembly with a stationary metering rod with a cylindrical portion and a conical portion and a relatively moveable element in the shape of a hollow cylindrical toroid. The relatively moveable element is biased by a spring to a rest position wherein the cylindrical portion of the stationary metering rod blocks flow through the relatively moveable element. During fluid flow, fluid pressure moves the relatively moveable element so that the conical portion of the stationary metering rod is within the hollow portion of the relatively moveable element thereby creating a flow area and allowing flow therethrough. A toroidal ferrite is biased against the relatively moveable element and moves in unison therewith. The position of the toroidal ferrite is electromagnetically determined thereby allowing for a calculation of the fluid flow therethrough. Low flowrates indicative of a trickle leak and large flowrates indicative of a large leak can be detected. After predetermined periods of time of the detection of unacceptable flowrates, a ball valve is activated to terminate flow.

55 Claims, 5 Drawing Sheets

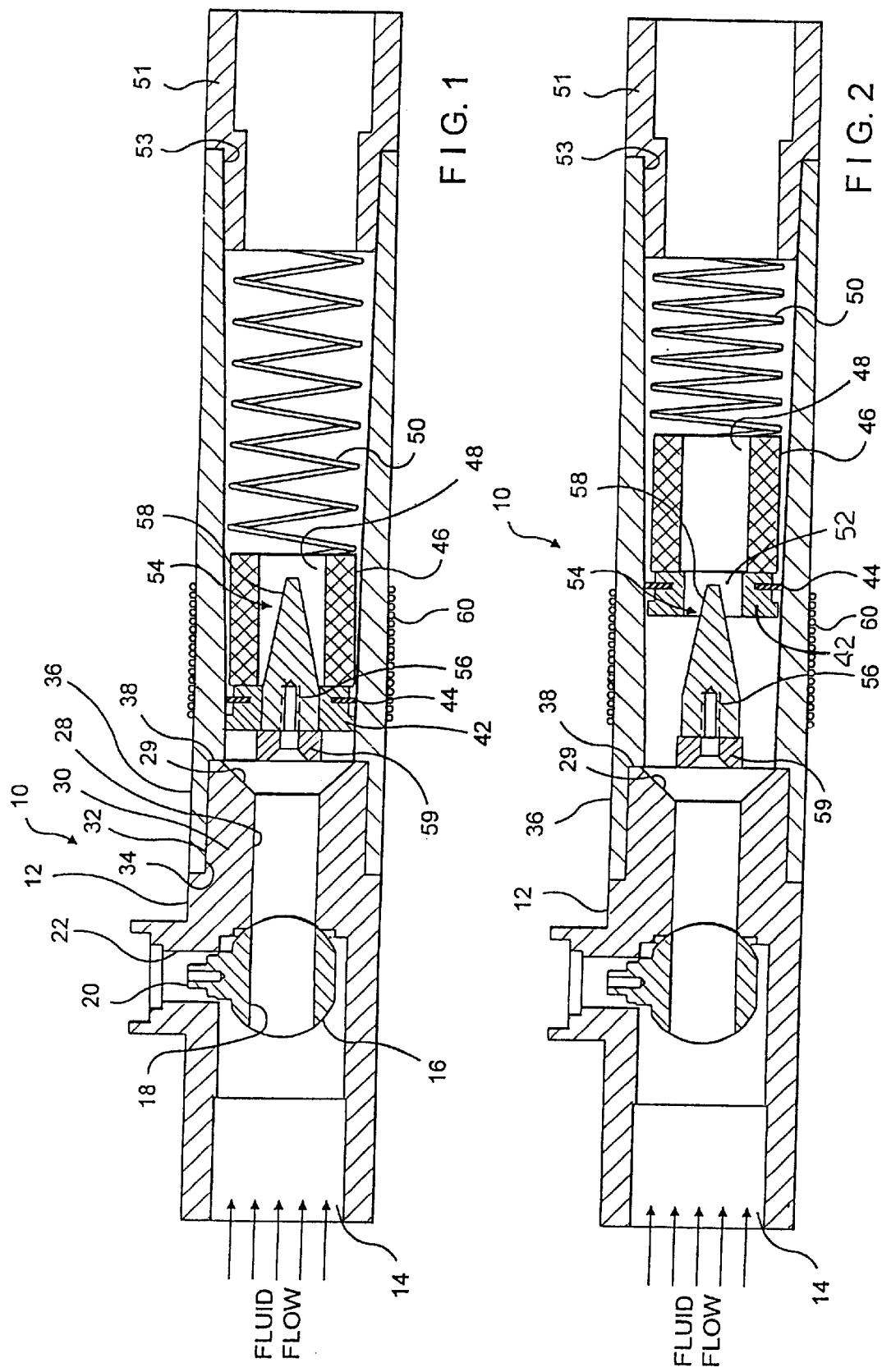

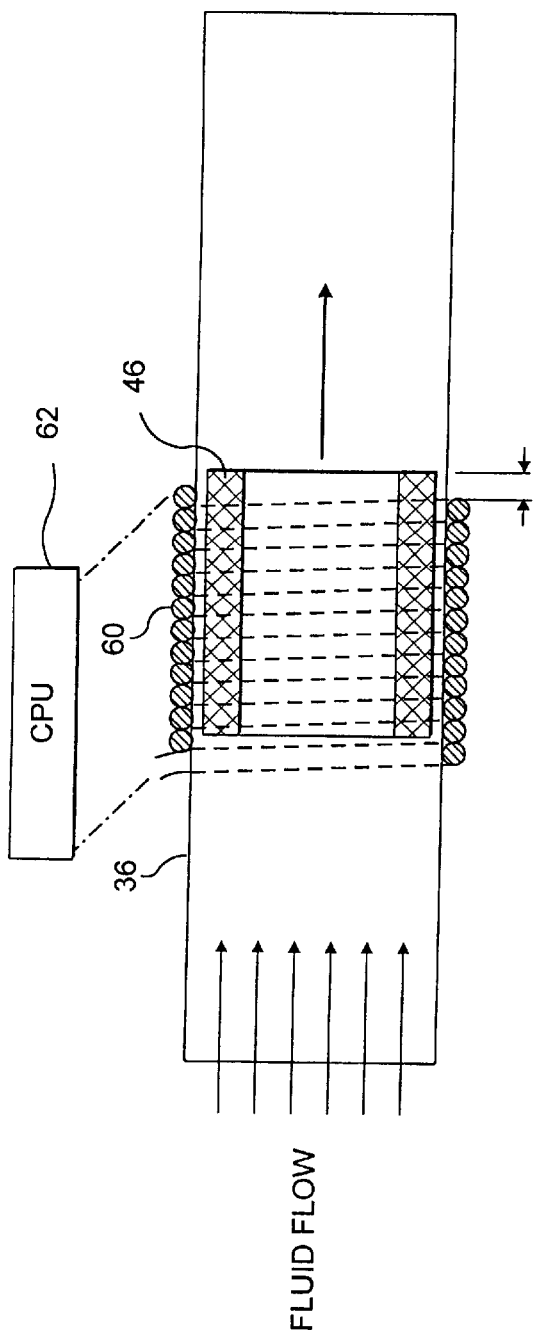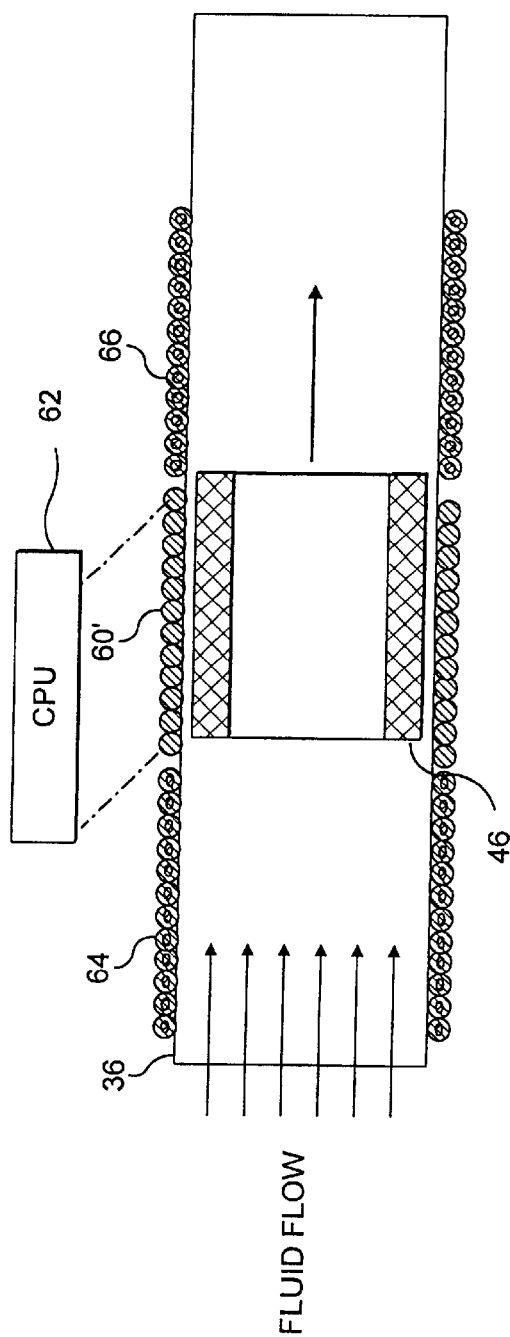

WATER FLOW SENSING DEVICE

CROSS REFERENCE TO RELATED APPLICATION

This is a continuation-in-part of application Ser. No. 09/262,881, filed Mar. 8, 1999, now abandoned, the entire disclosure of which is incorporated by reference.

FIELD OF THE INVENTION

The present invention relates to automatic water shut off valves for measuring the flow of water through the valve and shutting off the flow of water in response to a predetermined flow condition.

BACKGROUND OF THE INVENTION

It is known to provide automatic water shut off valves that have the ability to sense a water leak and automatically close the valve so as to prevent further leakage and damage. See for example, the disclosures found in U.S. Pat. Nos. 5,771,920 and 5,794,653, the disclosures of which are expressly incorporated by reference. While such automatic water shut off valves are known, many have not had the ability to sense both very small trickle leaks and large catastrophic leaks with great reliability. Further, some of the automatic water shut off valves of the prior art are mechanically cumbersome and very expensive to manufacture and maintain. Therefore, there is and continues to be a need for an automatic water shut off valve that is of a relatively simple design that has the ability to sense and detect relatively small trickle leaks as well as large catastrophic leaks and to shut off the associated valve in response to detecting either.

Water leakage detection systems are generally effective to stop the leakage once the leakage problem has been detected. However, water leakage detection systems of the prior art have done very little to minimize the damage caused by a leak once the leak has indeed occurred. In cases where the home or building is attended, then once a leak occurs and the main supply of water has been shutoff, then steps can be taken to remove standing water from areas and do whatever is required to minimize the damage. The problem comes into play when there is a leak, especially a catastrophic leak, in a home or building that is unattended. For example, a catastrophic leak even though detected and stopped can leave standing water on hardwood floors, for example. If the standing water remains on the hardwood floors for any significant amount of time, one can expect the floor to buckle and be so severely damaged that a new floor is required.

Therefore, there is a need for a water leakage detection system that will communicate the existence of a leakage to a central clearing station, such as a security service, if a home or building is unattended. The reporting of a leak to a central clearing center will permit the away homeowner to be contacted or even a repair service to be contacted so that the water damage can be immediately cleared and the problem causing the leak repaired.

SUMMARY OF THE INVENTION

The problems of the prior art are solved by providing a flow sensor assembly comprising a stationary metering rod with a cylindrical portion and a conical portion. A movable toroidal sensing disk circumferentially engages the cylindrical portion of the stationary metering rod during zero or low flow conditions resulting in high sensitivity at low flowrates. The liquid flows through the annular space between the stationary metering rod and sensing disk. However, at higher flowrates, the toroidal sensing disk is urged to a position circumferentially outward from the conical portion of the stationary metering rod thereby creating a larger flow cross section between the stationary metering rod and the sensing disk resulting in a decrease in sensitivity of the sensor while greatly increasing the range without excessive pressure drop. The movement of the toroidal sensing disk translates into movement of a spring-biased longitudinally adjacent toroidal ferrite. The ferrite has a high magnetic permeability and the position thereof affects the resonate frequency of a coil circumferentially wound about an exterior of the sensor tube. The resonant frequency is measured by a microprocessor which thereby calculates a flowrate based on the known flow/deflection characteristics of the sensor.

The microprocessor is programmable to respond differently to different flow rates. For example, a sudden large increase in the flow for more than ten to twenty minutes would be indicative of a catastrophic leak and the microprocessor could be programmed to shut the valve. Additionally, a long term low volume flow would be indicative of a trickle leak and the microprocessor could be programmed to shut the valve in this instance as well. Other acceptable flow conditions could also be programmed, for example, watering the lawn.

The microprocessor is further preferably connected to a security controller which in turn is connected to a remote station such as a security service computer or the like. Detection of a leak would trigger an alarm at the remote station resulting in the security service calling a plumber or the like as needed. The microprocessor could furthermore be integrated into the security controller if desired.

BRIEF DESCRIPTION OF THE DRAWINGS

Further objects and advantages of the invention will become apparent from the following description and claims, and from the accompanying drawings, wherein:

FIG. 1 is a cross-sectional view of the sensor of the present invention in the zero flow configuration;

FIG. 2 is a cross-sectional view of the sensor of the present invention in the high flow configuration;

FIG. 3 is a diagram of the oscillating coil apparatus for determining ferrite position;

FIG. 4 is a diagram of the linear variable differential transformer apparatus for determining ferrite position;

DETAILED DESCRIPTION OF THE PREFERRED EMBODIMENT

Figure 5:
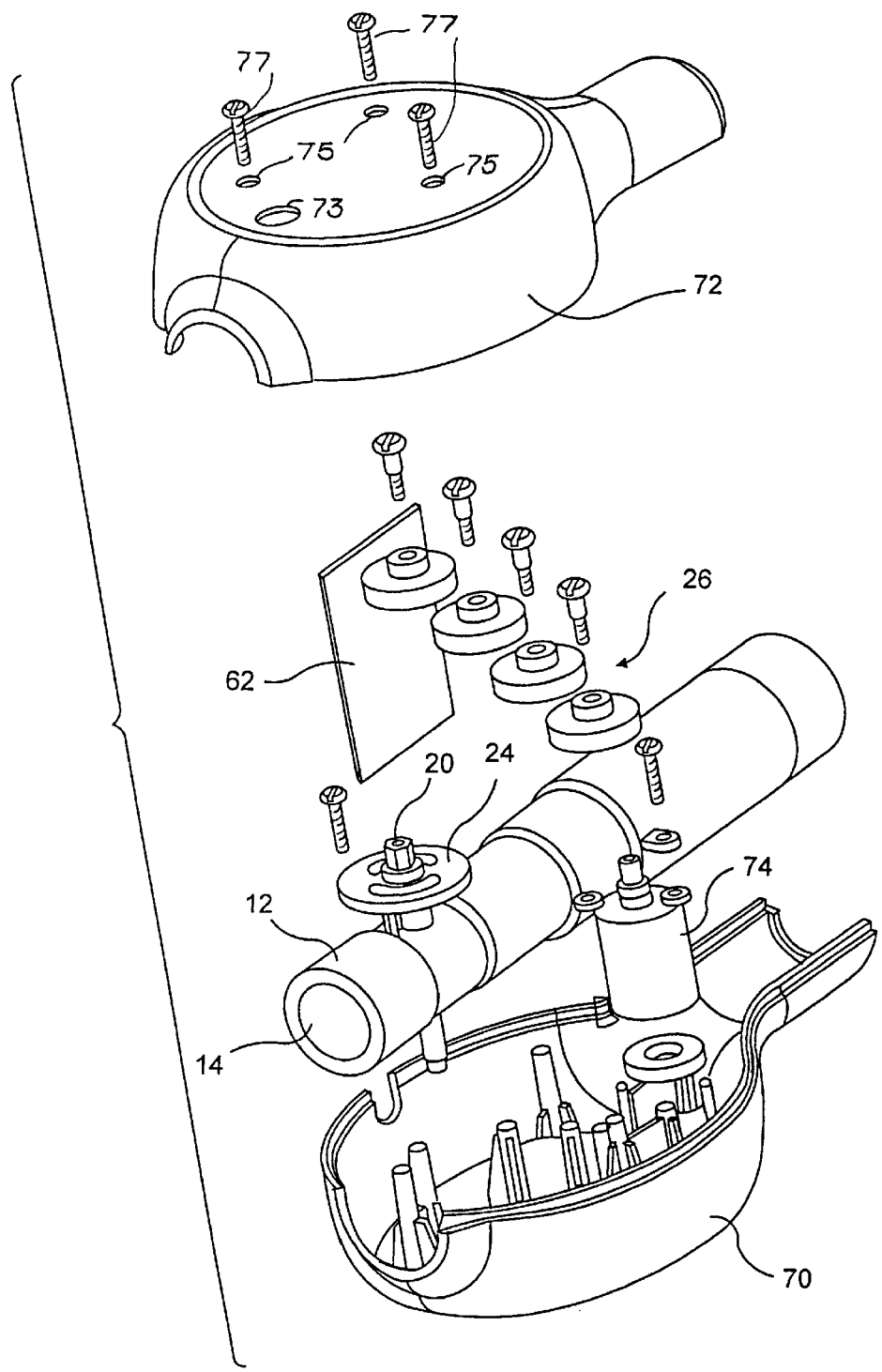
FIG. 5 is an exploded perspective view of the sensor of the present invention.

Referring now to the drawings in detail wherein like numerals indicate like elements throughout the several views, one sees that FIG. 1 shows sensor 10 with a flow passage defined by cylindrical hollow inlet tube 12. Fluid enters through opening 14 of inlet tube 12. Flow is controlled by a rotationally seated ball valve 16. Ball valve 16 is generally spherical with channel 18 which is aligned with inlet tube 12 thereby permitting flow as shown in FIG. 1 or turned to be perpendicular with inlet tube 12 thereby inhibiting flow. Ball valve 16 further includes stem 20 which is journaled for rotation in passageway 22 which is formed on the cylindrical wall of inlet tube 12. As shown in FIG. 5, stem 20 is affixed to gear 24 which is driven by step-down cluster gear assembly 26 or can be manually driven, both of which will be described in detail hereinafter. The ball valve 16 thereby functions as a shutoff valve for the water line.

Liquid flows through channel 18 of ball valve 16 in the open position and passes through channel 28 of inlet tube 12. Channel 28 includes conical outwardly flared section 29. Wall portion 30 surrounding channel 28 has a portion 32 of reduced diameter in order to allow portion 32 to be received within opening 34 of hollow cylindrical sensor tube 36. Opening 34 includes cylindrical stop 38 of reduced diameter to limit insertion of inlet tube 12 into sensor tube 36. Sensor tube 36 is typically molded plastic although those skilled in the art will realize that other materials may be suitable for this purpose.

The internal diameter of sensor tube 36 is preferably matched to the outermost diameter of conical outwardly flared section 29 of channel 28 of inlet tube 12.

Toroidal sensing disk 42 is slidably engaged within the internal diameter of sensor tube 36. Flow between sensor tube 36 and toroidal sensing disk 42 is prevented by seal washer 44 which is affixed to toroidal sensing disk 42 and is urged against the inside diameter of sensor tube 36.

Toroidal ferrite 46, which has a high magnetic permeability, with internal passageway 48 is urged against toroidal sensing disk 42 by coil spring 50. Together, toroidal sensing disk 42 and toroidal ferrite 46 form an axially movable sleeve, which moves along the axis of the water line. Internal passage 48 or toroidal ferrite 46 is aligned with passageway 52 of toroidal sensing disk 42 and preferably somewhat larger in diameter. Coil spring 50 additionally urges against relatively stationary sensor tube adapter 51 which is received within outlet opening 53 of sensor tube 36. The Hooke's constant of coil spring 50 can be varied to vary the sensitivity of sensor 10.

Metering rod 54 includes cylindrical portion 56 and conical portion 58 and is stationary within sensor tube 36 as affixed by spoked support 59. Spoked support 59 defines the resting or zero flow position of toroidal sensing disk 42 as shown in FIG. 1. In this resting or zero flow configuration of FIG. 1, cylindrical portion 56 is engaged within passageway 52 of toroidal sensing disk 42 and all flow must take place through a very small annular space between toroidal sensing disk 42 and stationary metering rod 54 which results in a pressure differential across toroidal sensing disk 42. The lack of tapered surfaces between the cylindrical portion 56 of metering rod 54 (both of which are precisely machined) and toroidal sensing disk 42 and between the toroidal sensing disk 42 and the interior of sensor tube 36 in the resting or no flow position of toroidal sensing disk 42 provides a large initial displacement of toroidal sensing disk 42 at very low flowrates, such as may occur during a trickle leak. During high flow conditions, this pressure differential exerts a force in the direction of flow which displaces toroidal sensing disk 42 and toroidal ferrite 46 to the position illustrated in FIG. 2 whereby conical portion 58 of metering rod 54 is within passageway 52 of toroidal sensing disk 42 thereby increasing the area within passageway 52 available for flow. Thus metering rod 54 acts as a sleeve insert for the sleeve formed by the sensing disk 42 and the ferrite 46. When the sensing disk 42 abuts the sleeve insert 54, a no-flow condition exists. However, when water pushes against the sensing disk 42, and spring 50 compresses, flow area is created, and a flow condition exists. Water then flows around the insert 54 and through the sleeve.

Coil 60 is wrapped around the exterior of sensor tube 36 outward from the zero flow position of toroidal ferrite 46 as shown in FIG. 1. Coil 60 is in electric and electronic communication with CPU and associated interface circuitry 62 (see FIG. 3) and is configured to detect the position of toroidal ferrite 46 thereby permitting CPU 62 (with associated interface circuitry) to calculate the flow through sensor 10 based on known flow/deflection characteristics of sensor 10. Collectively, the coil 60, the ferrite 46 and the central processor 62 form a transducer which converts the movement of the sleeve into a measurement of the water flow through the shutoff valve. Note that the central processor 62 is programmable to allow different threshold flow rates for certain periods of time to trigger the closure of ball valve 16.

Coil 60 can operate on one of two principles—electronic detection with a simple oscillating coil or electronic detection linear variable differential transformer (LVDT).

The use of a simple oscillating coil 60 is illustrated in FIG. 3. Coil 60 is wound circumferentially around sensor tube 36 over the zero flow position of toroidal ferrite 46 (FIG. 1). The length of coil 60 is likewise similar to the length of toroidal ferrite 46. Coil 60 is an inductive component in an electronic oscillating circuit. As toroidal ferrite 46 moves with respect to coil 60, the frequency of oscillation of coil 60 changes proportionately thereby providing a quantification of the distance toroidal sensing disk 42 has moved with respect to stationary metering rod 54 and, consequently, the resulting flow area between toroidal sensing disk 42 and stationary metering rod 54 and the pressure differential across toroidal sensing disk 42. This results in a calculation of the flowrate through sensor 10. As shown in FIG. 3, the position of the coil 60 is preferably offset a small distance with respect to the rest position of toroidal ferrite 46, such as one sixteenth of an inch in the opposite of the fluid flow direction. This ensures that a small initial movement of toroidal ferrite 46 in the direction of flow, such as may occur during a trickle leak circumstance, is detected by an appropriate unidirectional change in the oscillation frequency of coil 60.

The use of a linear variable differential transformer (LVDT) configuration is illustrated in FIG. 4. Linear variable differential transformers are wound coil, electromagnetic devices which are used to translate the linear movement of a ferromagnetic armature into an AC voltage which is linearly proportional to the armature position. As implemented in FIG. 4, linear variable differential transformer 62 includes primary coil 60' centrally located about secondary coils 64, 66. Primary coil 60' is excited by an AC voltage which is set at a specific amplitude and frequency (which is known as the primary excitation). Primary coil 60' induces a variable voltage in secondary coils 64, 66 as toroidal ferrite 46, which acts as a ferromagnetic plunger, moves axially within the coils 60', 64, 66. The electrical output of LVDT 62 is the differential AC voltage between the two secondary coils 64, 66, which varies with the axial position of toroidal ferrite 46 within LVDT 62. Typically, this AC output voltage is converted by suitable electronic circuitry to high level DC voltage or current which is more convenient to use. The amplitude of the resultant voltage is proportional to the position of toroidal ferrite 46, while the phase sense of the voltage indicates direction of movement from a reference zero position. Secondary coils 64, 66 are connected in opposite to produce zero voltage output when toroidal ferrite 46 is at the resting (no flow) position. As toroidal sensing disk 42 and toroidal ferrite 46 move away from one secondary coil and closer to another secondary coil, the induced voltage between the primary coil 60' and the respective secondary coils changes thereby allowing for a precise calculation of the position of the toroidal ferrite 46 and hence the flowrate through sensor 10.

The advantages of the use of coil 60, either as a simple oscillating coil or as a LVDT, are low cost, high sensitivity to very low flowrates while maintaining a broad flow range (thereby permitting detection of both trickle leaks and catastrophic leaks), an electronic interface and low cost manufacturing practices.

FIG. 5 illustrates how the ball valve 16 is closed in response to the detection of either a trickle leak or a catastrophic leak. Sensor 10 is contained within a housing formed from halves 70, 72. Half 72 includes key aperture 73 which allows a user to insert a key (not shown) and manually drive gear 24 to open or close ball valve 16 (see FIG. 1), such as during an electrical power outage. Half 72 further includes screw apertures 75, to allow screws 77 to fasten halves 70, 72 to each other. When CPU and associated interface circuitry 62 determines that an unacceptable flowrate has continued for an unacceptable period of time (this unacceptable period of time or threshold can be dependent upon the flowrate, so that the threshold associated for a trickle leak can be different from the threshold associated with a large or disastrous leak and intermediate flowrates may have no threshold as such flowrates may be indicative of normal use), CPU and associated interface circuitry 62 activates motor 74 which through step-down cluster gears assembly 26 turns gear 24 which turns stem 20 and ball valve 16 one-quarter turn to the closed position. CPU and associated interface circuitry 62 can likewise effect the rotation of ball valve 16 to an open position in response to a user command.

Figure 6:
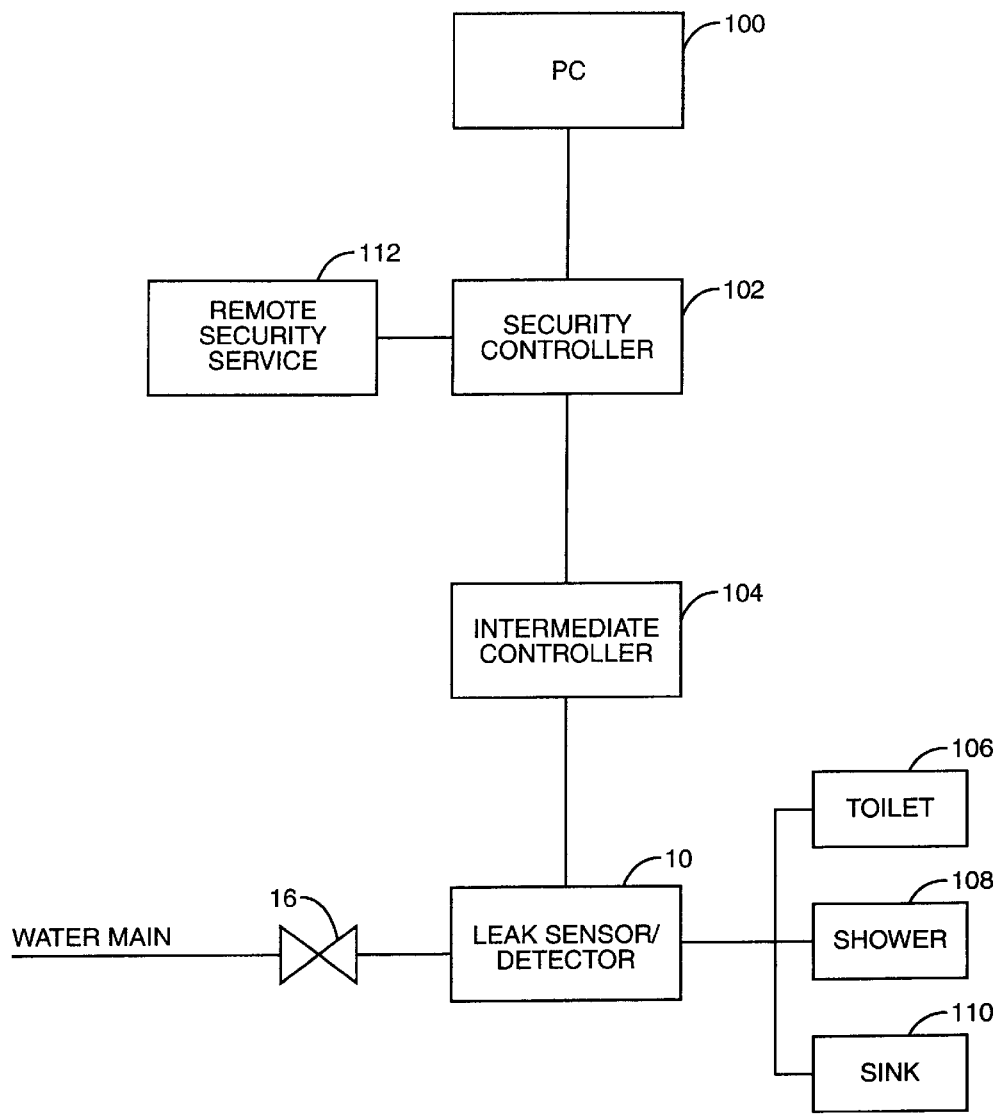
FIG. 6 is a block diagram illustrating the sensor of the present invention being connected to a security system.
Figure 7:
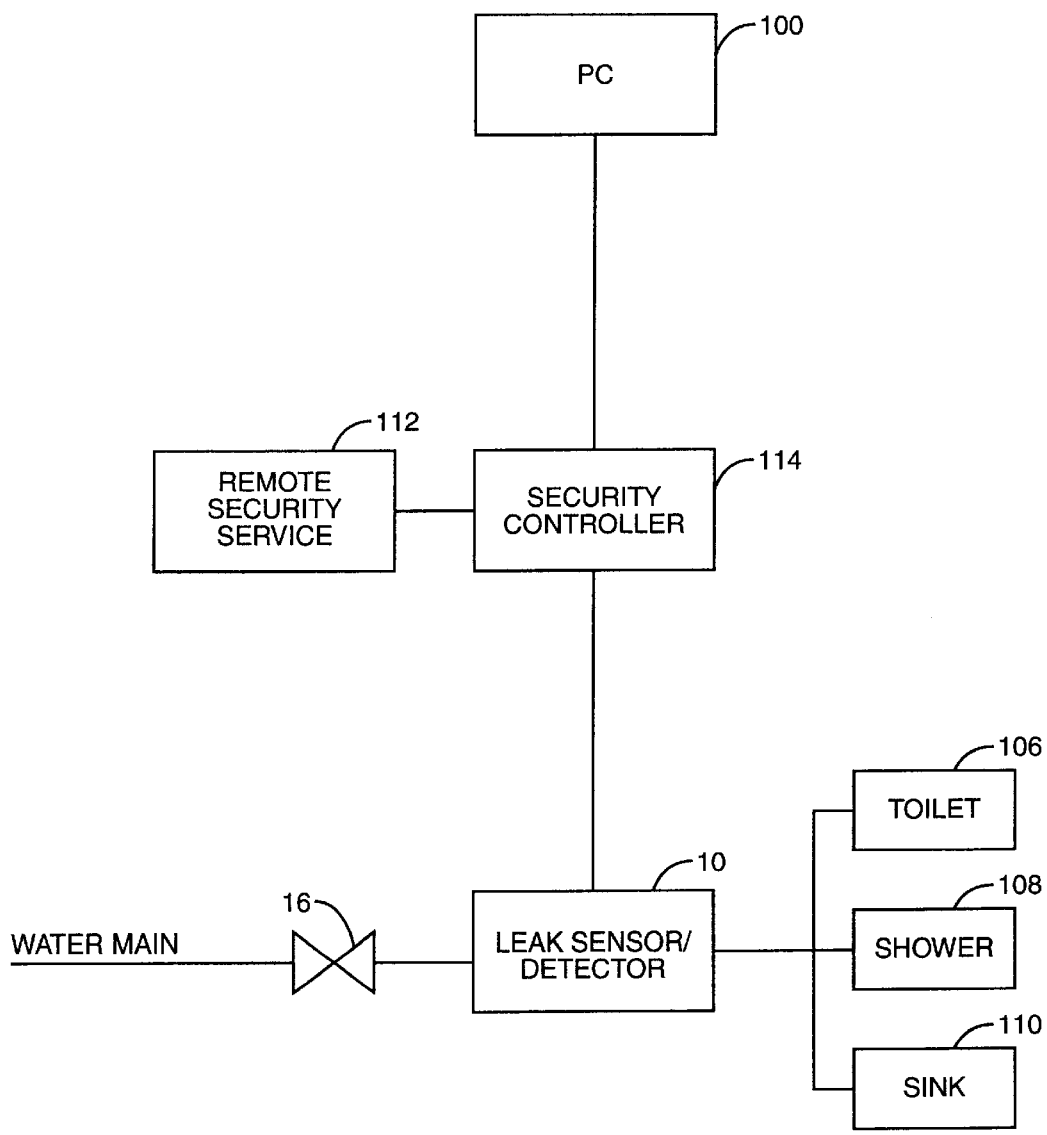
FIG. 7 is a block diagram illustrating an alternative design for connecting the sensor to a security system.

The sensor or water valve assembly 10 may further be incorporated into a home security system, as shown in FIGS. 6 and 7. Specifically, FIG. 6 shows a personal computer 100, which may be used to program a security controller 102 and an intermediate controller 104. The intermediate controller 104 controls the sensor or water valve assembly 10, and thus valve 16, which allows water to flow therethrough to household water uses such as a toilet 106, a shower 108 or a sink 110. The security controller 102 is connected via a conventional phone line to a remote station 112 such as a security service. The security controller 102 is independently programmable as is the intermediate controller 104, but greater flexibility in the programming is possible through the PC 100. Alternatively, the intermediate controller 104 may be integrated into the security controller 114 as seen in FIG. 7. All other aspects remain the same.

In the preferred embodiment, the security system is programmed either through the PC 100 or the controllers 102 and 104 to have a home mode and an away mode. In the away mode, the thresholds for leak detection may be lower since the away mode assumes that the people normally inhabiting the home are away, and consequently water consumption or use by them would be expected to be zero. Allowances can be programmed for incidental water flow as well as other periodic water uses such as lawn irrigation.

In the home mode, the thresholds would be higher as would be expected through everyday use including showers, laundry, dish washing, and the like. As noted above, the PC 100 or the intermediate controller 104, which includes the CPU 62, could be programmed to have a plurality of thresholds which reflect different acceptable uses. This provides great flexibility to the homeowner, who does not have to worry about false alarms, yet at the same time, it provides peace of mind in that any unusual use will trigger an alarm at the remote station 112 and shutoff valve 16 to arrest the flow of water in the water line.

In use, when the sensor 10 detects a leak and actuates the shutoff valve 16, it simultaneously sends a signal to the security controller 102 in the embodiment illustrated in FIG. 6 or to the security controller 114 in the embodiment shown in FIG. 7. Once the leak signal is received by the security controller, the security controller then directs a signal or some form of a communication to the remote station 112, identifying that a leak has been detected at a certain homeowner's residence. At this point, a number of events can happen. First, the remote station can contact the homeowner who has previously identified his or her whereabouts during this away period. Further, the homeowner may have identified a plumber or other repair service that would be on call for such situations and accordingly upon the occurrence of a leak and the receipt of that information by the remote station, the plumber or the repair service is called. Finally, the homeowner may have designated other individuals to be called in the event of any type of alarm including the detection of a leak within the home.

Thus the several aforementioned objects and advantages are most effectively attained. Although preferred embodiments of the invention have been disclosed and described in detail herein, it should be understood that this invention is in no sense limited thereby rather its scope is to be determined by that of the appended claims.

What is claimed is:

1. A water valve assembly for controlling the flow of water through a water line, comprising:
   a) a housing;
   b) a main shutoff valve positioned within said housing for selectively controlling a flow of water through the water line; and
   c) a variable flow measuring assembly associated with said shutoff valve, and including
      i) an axially movable sleeve contained within the housing and having an opening formed therein and movable from a closed position to an open position;
      ii) a sleeve insert mounted in the housing and disposed relative to the sleeve such that at least a portion thereof projects into the opening of the sleeve such that in the closed position there is a generally no flow condition through the shutoff valve;
      iii) wherein when the sleeve moves from the closed position towards the open position, water is permitted to flow around the sleeve insert and through the opening of the sleeve; and
      iv) a transducer for converting the movement of the sleeve to a measurement of water flow through the shutoff valve.

2. The water valve assembly of claim 1 wherein said variable flow measuring assembly further includes a spring for biasing said movable sleeve to said closed position.

3. The water valve assembly of claim 2 wherein said spring is spaced from said sleeve insert and abuts said sleeve so as to urge said sleeve against said sleeve insert.

4. The water valve of claim 1 wherein the transducer includes:
   a) an electrically conductive coil disposed around said housing for sensing the movement of the sleeve; and
   b) a central processing unit operatively connected to the coil for calculating the flow of water through the valve during a selected period of time based on the magnitude of movement of the sleeve as determined by the coil.

5. The water valve assembly of claim 4 wherein said sleeve is formed, in part at least, from a ferromagnetic material.

6. The water valve assembly of claim 5 wherein said coil is approximately the same length as said sleeve.

7. The water valve assembly of claim 6 wherein said sleeve is positioned concentrically within said coil.

8. The water valve assembly of claim 1 further comprising a central processing unit operatively connected to the shutoff valve and to the flow measuring assembly and operative to close the shut off valve in response to the fluid measuring assembly detecting a leak.

9. The water valve assembly of claim 8 further comprising an actuator, said actuator converting the instructions of the central processing unit to physical movement to close the shutoff valve.

10. The water valve assembly of claim 9 wherein said actuator comprises a motor and a step-down cluster of gears.

11. The water valve assembly of claim 1 further comprising a central processing unit operatively connected to said transducer for determining whether a leakage exists within the water line based upon the position of the sleeve.

12. The water valve assembly of claim 11 wherein said central processing unit is programmable to set a series of thresholds flow limits and wherein the occurrence of one of the threshold flow limits is operative to cause the shut off valve to close.

13. The water valve assembly of claim 12 wherein said series of thresholds flow limits indicate a series of leaks of various magnitude ranging from a catastrophic leak to a trickle leak.

14. A water flow measuring device having a shutoff valve incorporated into a housing and including:
    a) a movable sleeve contained within the housing such that water flow through the valve is constrained to flow through the sleeve;
    b) a cooperating insert that projects into one end of the sleeve such that in a water flow condition a metering opening is defined between the sleeve and the sleeve insert such that water flows about the insert and through the sleeve opening;
    c) wherein in a no flow condition, the metering opening between the sleeve insert and the sleeve is substantially closed while the metering opening progressively increases in size as the flow of water increases through the flow measuring device; and
    d) a transducer for converting the movement of the sleeve to a measurement of water flow through the shutoff valve.

15. A method of communicating to a central security station information as to the existence of a leak in a water pipe of a building, comprising:
    a) detecting a leak in the water pipe;
    b) sending an alert signal to a security controller within the building;
    c) directing a second alert signal containing information relative to the existence of a leak from the security controller to a central security station removed from the building;
    d) sending the alert signal from an automatic shutoff valve in the water pipe to an intermediate controller prior to sending the alert signal to the security controller in the building.

16. The method of claim 15 wherein detecting the leak comprises the step of detecting the leak with an automatic shutoff valve.

17. The method of claim 15 further comprising the step of selecting between a home mode or an away mode on the security controller.

18. The method of claim 15 wherein the security controller includes both a home mode and an away mode, and wherein the security controller is programmable for various threshold flow limits, with each flow limit representing the occurrence of a leak.

19. The method of claim 15 further comprising the step of programming the security controller via a computer.

20. A system for detecting a leakage in a water pipe network, comprising:
    a) an automatic shutoff valve, connected in at least one line of the water pipe network, for detecting a water leakage somewhere in the water pipe network;
    b) a security controller operatively connected to the automatic shutoff valve for receiving a signal from the valve that indicates a leakage in the water pipe network;
    c) wherein the security controller is operatively connected to a remote station and is operative to direct signals to the remote station indicating the presence of a water leakage in the water pipe network;
    d) an intermediate controller operatively positioned between the automatic shutoff valve and the security controller for controlling the automatic shutoff valve.

21. The system of claim 20 wherein the security controller includes a home mode and an away mode wherein the home mode is programmable for various leakage thresholds.

22. The system of claim 20 further including a computer for programming the security controller.

23. A fluid flow sensor comprising:
    a) a fluid communication path;
    b) an assembly within said fluid communication path comprising a moveable sleeve portion moveable in responsive to fluid pressure and a stationary insert portion;
    c) a spring for biasing said moveable sleeve portion to a no-flow position with respect to said stationary insert portion;
    d) wherein in response to fluid pressure, said moveable sleeve portion moves from said no-flow position to a flow position;
    e) wherein when the sleeve assumes the flow position, water flows about the stationary insert and through the moveable sleeve;
    f) a transducer for sensing the movement of the sleeve; and
    g) a processor for determining the flow rate of water through the fluid communication path based on the sensed movement of the sleeve by the transducer.

24. The flow sensor of claim 23 further including a shutoff valve moveable between open and closed positions and wherein the processor is preprogrammed to actuate and close the shutoff valve in response to a predetermined flow of water over a given time period flowing through the flow sensor.

25. The flow sensor of claim 23 wherein said stationary insert portion includes a cylindrical portion and a tapered portion, and wherein the sleeve includes an inside diameter that is generally equal to the diameter of the cylindrical portion of the stationary insert, and wherein in a no flow condition, the sleeve extends around the central portion of the stationary insert, and wherein in a flow position the sleeve moves away from the cylindrical portion of the stationary insert in response to fluid pressure, permitting the water to flow around the cylindrical portion of the stationary insert and between the inside diameter of the sleeve and the tapered portion of the insert.

26. The fluid flow sensor of claim 25 further including an electromagnetic element which moves in response to movement of said relatively moveable sleeve portion.

27. The fluid flow sensor of claim 26 wherein said electromagnetic element has high magnetic permeability.

28. The fluid flow sensor of claim 27 wherein said electromagnetic element is a ferrite element.

29. The fluid flow sensor of claim 28 wherein said ferrite element is hollow and fluid flow passes therethrough.

30. The fluid flow sensor of claim 29 wherein said transducer includes at least one coil wound about an exterior of said fluid communication path, and said processor includes electronic computational circuitry responsive to changes in the current in said coil for calculating the flow of water through the fluid communication path.

31. The fluid flow sensor of claim 30 wherein said at least one coil is an oscillating coil.

32. The fluid flow sensor of claim 30 wherein said at least one coil is a linear variable differential transformer configuration.

33. The fluid flow sensor of claim 30 wherein said shutoff valve is a ball valve responsive to a motor responsive to said electronic computational circuitry.

34. The fluid flow sensor of claim 33 wherein said ball valve is responsive to said motor via a step down cluster gear assembly.

35. A method of measuring the flow of water through an automatic shut off valve comprising:
   a) directing water into and through the automatic shut off valve;
   b) in response to the water pressure within the valve moving a moveable flow measuring element relative to a stationary element and directing the flow of water around the stationary element and through an opening formed completely through the moveable flow measuring element;
   c) determining the flow rate of water through the automatic shut off valve based on the magnitude of the movement of the moveable flow measuring element; and
   d) if the measured flow rate of water passing through the automatic shut off valve equals or exceeds a predetermined flow condition, then actuating a valve that shuts off the flow of water through the automatic shut off valve.

36. The method of claim 35 further including biasing the moveable flow measuring element to a no-flow position where it mates with the stationary element.

37. The method of claim 36 wherein the moveable flow measuring element includes a sleeve having a water flow through opening formed therein and wherein the sleeve moves axially back and forth as the water flow rate through the automatic shut off valve varies.

38. The method of claim 35 wherein determining the flow rate of water through the automatic shut off valve includes the step of electromagnetically detecting and measuring the movement of the moveable flow measuring element and converting the movement of the flow measuring element to a water flow rate.

39. The method of claim 38 including the step of winding an electrical coil around the automatic shut off valve exteriorly of the moveable flow measuring element and incorporating an electromagnetic material with the moveable flow measuring element thereby permitting the magnitude of the movement of the flow measuring element to be determined based on the electrical state of the coil.

40. A fluid flow sensor comprising:
   a fluid communication path;
   an assembly within said fluid communication path comprising a relatively movable portion responsive to fluid pressure and a relatively stationary portion, wherein said relatively stationary portion includes a cylindrical portion and a tapered portion, said relatively moveable portion includes a toroidal portion with a passageway therethrough, a diameter of said cylindrical portion being substantially equal to a diameter of said passageway, wherein in a rest position said cylindrical portion blocks fluid flow through said passageway, and wherein in response to fluid pressure, said relatively moveable portion moves so that said tapered portion is in said passageway thereby allowing fluid flow therethrough;
   means for biasing said relatively movable portion to a rest position with respect to said relatively stationary position wherein said assembly has substantially no flow area;
   wherein, in response to fluid pressure, said relatively movable portion moves from said rest position to a position wherein said assembly has flow area;
   means for determining a position of said relatively movable portion; and
   means for determining a flowrate through said fluid communication path responsive to said means for determining a position of said relatively movable portion.

41. The fluid flow sensor of claim 40 including an electromagnetic element which moves in response to movement of said relatively moveable portion.

42. The fluid flow sensor of claim 41 wherein said electromagnetic element has high magnetic permeability.

43. The fluid flow sensor of claim 42 wherein said electromagnetic element is a ferrite element.

44. The fluid flow sensor of claim 43 wherein said means for biasing is a spring which biases said ferrite element against said relatively moveable portion.

45. The fluid flow sensor of claim 44 wherein said ferrite element is hollow and fluid flow passes therethrough.

46. The fluid flow sensor of claim 45 wherein said means for determining a position includes at least one coil wound about an exterior of said fluid communication path, and said means for determining a flowrate includes electronic computational means responsive to said coil.

47. The fluid flow sensor of claim 46 wherein said electronic computational means includes means for calculating a time period during which an unacceptable flowrate has been detected and comparing said time period to a time threshold, and activating said means for terminating flow upon said time period exceeding said time threshold.

48. The fluid flow sensor of claim 47 wherein said time threshold is dependent upon flowrate.

49. The fluid flow sensor of claim 46 wherein said at least one coil is an oscillating coil.

50. The fluid flow sensor of claim 46 wherein said at least one coil is a linear variable differential transformer configuration.

51. The fluid flow sensor of claim 46 wherein said means for terminating flow is a ball valve responsive to a motor responsive to said electronic computational means.

52. The fluid flow sensor of claim 51 wherein said ball valve is responsive to said motor via a step down cluster gear assembly.

53. A method for sensing fluid flow comprising the steps of:

providing a fluid communication path;

providing an assembly within said fluid communication path comprising a relatively movable portion including a toroidal portion with a passageway therethrough responsive to fluid pressure, a relatively stationary portion including a cylindrical portion and a tapered portion, a diameter of said cylindrical portion being substantially equal to a diameter of said passageway, and a means for determining a position of said relatively movable portion;

biasing said relatively movable portion to a rest position with respect to said relatively stationary portion wherein said assembly has substantially no flow area, wherein in said rest position said cylindrical portion blocks fluid flow through said passageway;

moving, in response to fluid pressure, said relatively movable portion from said rest position to a position wherein said assembly has flow area, wherein in response to fluid pressure, said relatively moveable portion moves so that said tapered portion is in said passageway thereby allowing fluid flow therethrough;

determining a position of said relatively movable portion;

determining a flowrate through said fluid communication path responsive to said means for determining a position of said relatively movable portion; and terminating flow through the fluid communication path responsive to said step of determining a flowrate through said fluid communication path.

54. The method of sensing fluid flow of claim 53 wherein said step of moving said relatively moveable portion further includes the step of moving an electromagnetic element.

55. The method of claim 54 wherein said step of moving an electromagnetic element further includes the step of providing an electromagnetic element with high magnetic permeability.

* * * * *